United States Patent [19]

Iwanaga et al.

[11] 4,294,140
[45] Oct. 13, 1981

[54] HYDRAULIC TORQUE CONVERTER CONTROL SYSTEM

[75] Inventors: Kazuyoshi Iwanaga, Yokohama; Kazuhiko Sugano, Tokyo; Kunio Ohtsuka, Yokohama, all of Japan

[73] Assignee: Nissan Motor Company, Limited, Yokohama, Japan

[21] Appl. No.: 5,892

[22] Filed: Jan. 23, 1979

[30] Foreign Application Priority Data

Sep. 4, 1978 [JP] Japan ................... 53-107529

[51] Int. Cl.³ ............... B60K 41/10; F16H 47/00; F16D 33/00
[52] U.S. Cl. ...................... 74/868; 74/733; 192/3.3; 192/3.29; 192/3.31
[58] Field of Search .............. 74/733, 868; 192/3.3, 192/3.29, 3.31, 3.23, 3.28

[56] References Cited

U.S. PATENT DOCUMENTS

| 2,824,632 | 2/1958 | Lucia et al. | 192/3.31 |
| 3,151,717 | 10/1964 | Kaptur et al. | 192/3.29 |
| 3,252,352 | 5/1966 | General | 74/645 |
| 3,621,955 | 11/1971 | Black | 74/733 |
| 3,667,323 | 6/1972 | Irie | 74/868 |
| 3,682,043 | 8/1972 | Bailey | 192/3.57 |
| 3,719,093 | 3/1973 | Edmunds | 192/3.3 |
| 3,757,644 | 9/1973 | Bailey et al. | 192/3.3 |
| 3,820,417 | 6/1974 | Allen | 74/733 |
| 4,044,556 | 8/1977 | Kuramochi | 192/3.28 |
| 4,051,932 | 10/1977 | Arai | 192/3.3 |
| 4,090,417 | 5/1978 | Burcz et al. | 74/733 |
| 4,091,899 | 5/1978 | Stevenson | 192/3.3 |
| 4,108,022 | 8/1978 | Arai | 192/3.33 |

FOREIGN PATENT DOCUMENTS

| 1650929 | 12/1970 | Fed. Rep. of Germany | 192/3.3 |
| 41-10402 | 1/1966 | Japan | 192/3.33 |

Primary Examiner—Leslie Braun
Attorney, Agent, or Firm—Schwartz, Jeffery, Schwaab, Mack, Blumenthal & Koch

[57] ABSTRACT

A lock-up control valve is operated into a position to effect a lock-up condition of a torque converter by a governor pressure fed by way of a shift valve when the vehicle operates at high speeds in high gear.

4 Claims, 5 Drawing Figures

4,294,140

HYDRAULIC TORQUE CONVERTER CONTROL SYSTEM

BACKGROUND OF THE INVENTION

The present invention relates to a hydraulic control system for a hydrokinetic torque converter including a lockup clutch.

As is well known in the art, in a hydrokinetic torque converter there is a slippage between a pump impeller and a turbine runner during operations of the torque converter. For this reason, although it is easy to operate and manipulate a vehicle equipped with an automatic transmission including the torque converter as a part of a power transmitting train, the fuel consumption of the vehicle is high. As a solution to this problem, various hydrokinetic torque converters have been proposed which lock-up when the vehicle operates at high speeds in high gear.

A lock-up control valve is provided, in a known torque converter, which pressurizes a lock-up chamber for releasing a lock-up condition or exhausts it for effecting the lock-up condition.

In order to effect the lock-up condition of the torque converter in response not only to gear position or positions of the automatic transmission but also to vehicle speed, it has been proposed by the same inventors of the present application to arrange a cut-off valve, between the control valve and a passageway which is pressurized with line pressure when the highest gear is selected, for allowing the line pressure to act on the control valve in response to governor pressure higher than a predetermined level. The control valve will exhaust the lock-up chamber upon receiving the line pressure from the cut-off valve.

A problem with this control system resides in that the provision of the cut-off valve, in addition to the control valve, results in an increase in complexity of construction of the control system and in an increase in the number of steps in piping of the control system, thus boosting up the cost of manufacturing automatic transmissions.

SUMMARY OF THE INVENTION

An object of the invention is to provide a hydraulic control system, for a torque converter including a lock-up clutch, which can effect the lock-up condition of the torque converter in response not only to gear position of the automatic transmission but also to vehicle speed and which has eliminated the provision of a cut-off valve, responsible to the governor pressure, physically separate from a lock-up control valve.

According to the invention, instead of the line pressure, the governor pressure is supplied to a lock-up control valve via a shift valve which differs from the conventional shift valve in the incorporation of another function that a passageway leading to the control valve is pressurized with the governor pressure when the shift valve takes one of two gear positions and is exhausted when the latter takes the other gear position.

One advantage of the invention over the previous proposal by the same inventors of the present application is therefore in that it is now not necessary to dispose the cut-off valve within a limited space and in that the number of working steps and cost for the installation of the cut-off valve is now eliminated.

Another object of the invention is therefore to provide a simple hydraulic control system for a torque converter including a lock-up clutch.

BRIEF DESCRIPTION OF THE DRAWINGS

The present invention will become more apparent from the following detailed description taken in connection with the accompanying drawings in which.

DESCRIPTION OF THE PREFERRED EMBODIMENT

Figure 1:
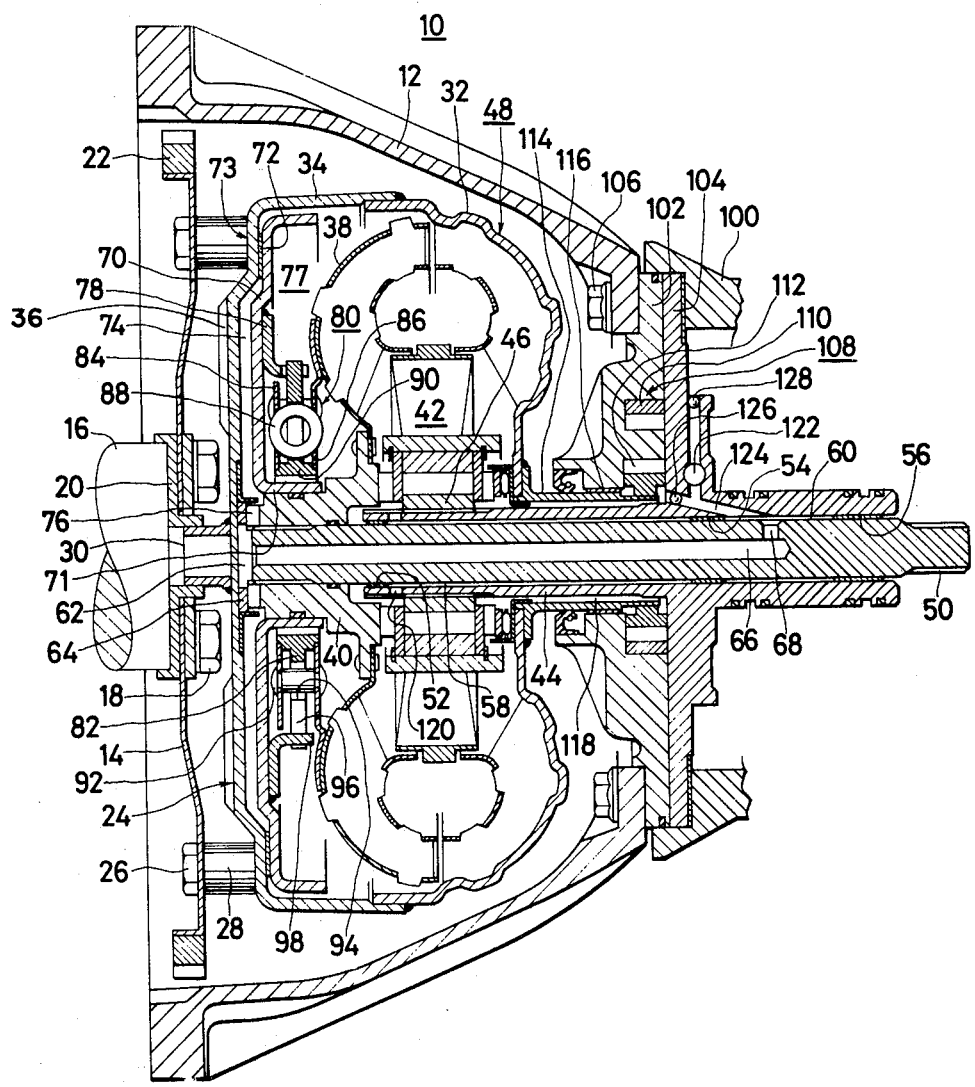
FIG. 1 is a schematic view of an example of a torque converter assembly including a hydrokinetic torque converter and a lock-up clutch.

Referring to FIG. 1 of the drawings, a torque converter assembly is shown which is controlled by a hydraulic control system according to the invention. The torque converter assembly, generally designated by the reference numeral 10, comprises a converter housing 12 and a drive plate 14 located in the housing 12 and fixedly concentrically secured to an end surface of a drive shaft 16 such as a crank shaft of an engine (not shown) by bolts 18 through a boss member 20. A ring gear 22 for starting the engine is fixedly secured to the periphery of the drive plate 14. A converter cover 24 is located between the housing 12 and the drive plate 14 and is fixedly concentrically secured to the drive plate 14 by bolts 26 through spacers 28. For centering the converter cover 24, a sleeve 30 is concentrically fixed secured to and projects from the converter cover 24 and is fitted in the boss member 20.

A pump impeller 32 is fixed by welding to an end portion of an annular side wall 34 extending from an end wall 36 of the converter cover 24. The pump impeller 32 is driven by the engine through the drive shaft 16, the drive plate 14 and the converter cover 24 at all times during operations of the engine. A turbine runner 38 is securely fixed to a flange of a hub 40 by rivets and is driven by pressurized hydraulic fluid delivered from the pump impeller 32. A stator 42 is rotatably mounted on a stationary hollow shaft 44 by way of a one-way clutch 46 which prevents the stator 42 from being rotated in a direction opposite to the direction of rotation of the drive shaft 16. The pump impeller 32, the turbine runner 38 and the stator 42 constitutes a hydrokinetic torque converter 48.

A transmission input shaft or a turbine shaft 50 passes through the stationary hollow shaft 44 and is spaced from an internal wall surface of the stationary hollow shaft 44. Three annular spacers or sleeves 52, 54 and 56 are disposed in an annular clearance between the inner wall surface of the stationary hollow shaft 44 and the turbine shaft 50 unmovably axially of the turbine shaft 50 and are spaced from each other axially of the turbine shaft 50. A first annular space 58 is defined between the spacers 52 and 54 and between the shafts 44 and 50 and is sealed from the outside thereof, while a second annular space 60 is defined between the spacers 54 and 56 and between the shafts 44 and 50 and is sealed from the outside thereof. The hub 40 of the turbine runner 38 is splined to the turbine shaft 50. An end surface of the turbine shaft 50 is spaced from the converter cover 24 so that a chamber 62 is defined therebetween. An annular spacer 64 is interposed between the converter cover 24 and an end surface of the hub 40 to surround the chamber 62. Fluid passages 66 and 68 are formed in the turbine shaft 50 and provide communication between the second annular space 60 and the chamber 62.

A lock-up clutch piston 70 is arranged between the converter cover 24 and the turbine runner 38 movably toward and away from the converter cover 24 and is slidably fitted at an inner cylindrical portion 71 on an outer circumferential surface of the hub 40. An annular shim or face plate 72 is fixedly secured to a side surface of the clutch piston 70 and is contactable with the converter cover 24. The clutch piston 70, the face plate 72 and the converter cover 24 facing the face plate 72 constitute a lockup clutch 73 which is engaged when the face plate 72 is pressed against the converter cover 24 and which is disengaged when the face plate 72 is not pressed against or is not in contact with the converter cover 24. A lock-up control chamber 74 is defined between the converter cover 24 and the lockup clutch piston 70 and between the spacer 64 and the face plate 72 and communicates with the chamber 62 by way of a groove 76 formed at the end surface of the hub 40. A torque converter chamber 77 is defined between the turbine runner 38 and the lockup clutch piston 70 and communicates with the interior of the torque converter 48. An annular connection member 78 of an angular shape in cross section is fixedly secured to a side surface of the lockup clutch piston 70 which faces the turbine runner 38. A torsional damper 80 is disposed in a relatively broad space at a radially inward portion of the torque converter chamber 77.

The torsional damper 80 includes a drive plate 82, a pair of driven plates 84 and 86 arranged respectively on both sides of the drive plate 82, and a torsion spring 88 interposed between the driven plates 84 and 86. The torsional damper 80 has a damper function and mechanism similar to that of a torsional damper used for a clutch disk and so on. The drive plate 82 has at its radially inward portion a hub 90 arranged around the cylindrical portion 71 of the lockup clutch piston 70 and spaced from the cylindrical portion 71. The driven plates 84 and 86 are fitted respectively on both side portions of the hub 90 and are connected to each other by rivets 92. The drive plate 82 is formed therethrough with round holes 94 and notches 96. The shaft portions of the rivets 92 pass respectively through the round holes 94 to define a clearance between the shaft portion of each rivet 92 and an inner wall surface of each round hole 94. The notches 96 are arranged at equal intervals radially outwardly of the round holes 94. The notches 96 aligned with the round holes 94 communicate with the round holes 94. The connection member 78 has at its radially inward portion projections 98 axially extending toward the turbine runner 38. The projections 98 pass through or are engaged in the notches 96 respectively to drivingly connect the connection member 78 and the torsional damper 80 to each other. The driven plate 86 adjacent the turbine runner 38 is concentrically fixedly secured to the turbine runner 38 by welding.

The converter housing 12 is fixedly secured at an open end adjacent the pump impeller 32 to a transmission case 100 together with a pump housing 102 and a pump cover 104 by bolts 106. The pump cover 104 is formed of a flange formed integral with the stationary hollow shaft 44. The pump housing 102 contains therein an oil pump 108 including an outer gear 110 and an inner gear 112 meshed with the outer gear 110. A pump drive shaft 114 is received at its mid portion in a bush or bearing 116 mounted in the pump housing 102. The pump drive shaft 114 takes the form of a sleeve arranged around the stationary hollow shaft 44 and is fixedly secured at one end to the pump impeller 32 and is splined at the other end to the inner gear 112. An annular passage 118 is defined between the stationary hollow shaft 44 and the pump drive shaft 114 and communicates at one end with the interior of the pump impeller 32 and at the other end with regulator means for torque converter working fluid pressure, which will be set forth hereinafter, by way of a passage (not shown) provided in the oil pump 108.

An aperture 120 is formed in the stationary hollow shaft 44 and provides communication between the interior of the turbine runner 38 and the first annular space 58. The first annular space 58 communicates with a hydraulic fluid reservoir by way of a pressure retaining valve, a relief valve and various lubricated portion, as will be set forth hereinafter. The second annular space 60 communicates with a lockup clutch control valve 122, which will be set out hereinafter, by way of a passage 124 formed in the pump cover 104. The passage 124 is sealed from the exterior thereof by steel balls 126 and 128 forced into the passage 124. The lockup clutch control valve 122 functions to switch over the connection of the passage 124 alternatively to the regulator means and the hydraulic fluid reservoir.

Figure 2:
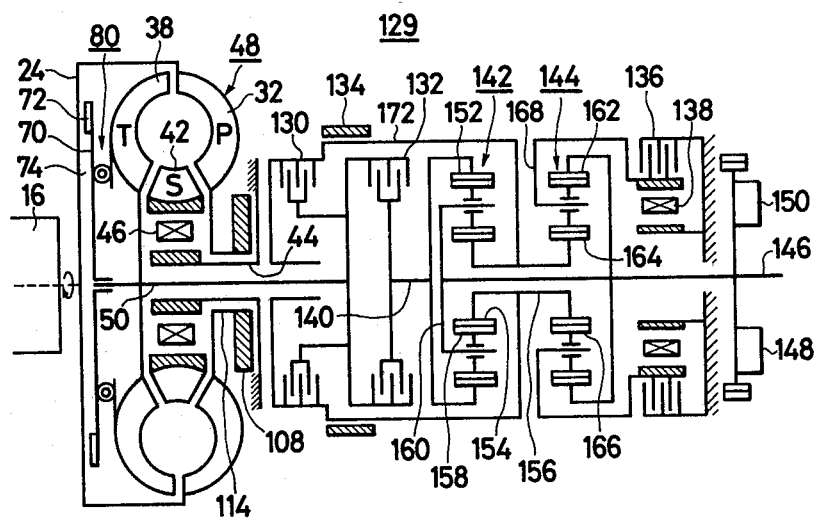
FIG. 2 is a schematic view of an example of an automatic transmission including the torque converter assembly shown in FIG. 1.

Referring to FIG. 2 of the drawings, there is diagrammatically shown an example of an automatic power transmission employing the lockup torque converter assembly 10 described hereinbefore. The transmission, generally designated by the reference numeral 129, has three forward speed ranges and one reverse speed range and includes a front clutch 130, a rear clutch 132, a second brake 134, a low and reverse brake 136, a one-way clutch 138, an intermediate shaft 140, a first planetary gear set 142, a second planetary gear set 144, an output shaft 146, a first governor valve 148 and a second governor valve 150.

The first planetary gear set 142 includes an internally toothed ring gear 152 fixed to the intermediate shaft 140, an externally toothed sun gear 154 fixed to a hollow shaft 156, at least two planet pinions 158 meshed with both the ring and sun gears 152 and 154, and a front pinion carrier 160 fixed to the output shaft 146 and carrying the planet pinions 158. Each of the planet pinions 158 is rotatable around its axis and simultaneously revolvable around the sun gear 154. The second planetary gear set 144 includes an internally toothed ring gear 162 fixed to the output shaft 146, an externally toothed sun gear 164 fixed to the hollow shaft 156, at least two planet pinions 166 in mesh with both the ring and sun gears 162 and 164, and a rear planet carrier 168 carrying the planet pinions 166 and connected to the low and reverse brake 136 and the one-way clutch 138. Each of the planet pinions 166 is rotatable around its axis and concurrently revolvable around the sun gear, 164. The front clutch 130 functions to connect the turbine shaft 50 to the hollow shaft 156 through a brake drum 172 fixed thereto when the front clutch 130 is engaged or tightened, while the rear clutch 132 functions to connect the input shaft 50 to the ring gear 152 of the first planetary gear set 142 through the intermediate shaft 140 when the rear clutch 132 is engaged or tightened. The second brake 134 takes the form of a band which is arranged around the brake drum 172 and functions to lock the hollow shaft 156 and both the sun gears 154 and 164 when the band is tightly wound on the brake drum 172. The low and reverse brake 136 functions to lock the rear planet carrier 168 of the second planetary gear set 144 when the brake 136 is applied. The one-way clutch 138 is constructed and arranged to allow the rotation of the rear planet carrier 168 in the direction similar to that of rotation of the drive shaft 16 but not allow the rotation in the reverse direction. The first and second governor valves 148 and 150 each are fixed to the output shaft 146 and deliver governor pressures representative of the speed of a vehicle equipped with the engine and form part of a hydraulic control system for the transmission 129 as described hereinafter.

The transmission 129 thus described is operated in the following manner.

When a manual selector lever (not shown) for the transmission 129 is set to an automatically shifted forward driving range position "D", the rear clutch 132 only is engaged and acts as an input clutch. The power of the engine is transmitted to the ring gear 152 of the first planetary gear set 142 by way of the rear clutch 132 after is transmitted to the input shaft 50 by way of the turbine runner 38. The planet gears 158 are rotated by the ring gear 152 in the same direction as that of rotation thereof. Accordingly, the sun gear 154 is rotated by the planet gears 158 in the reverse direction and since the sun gear 164 rotated integral with the sun gear 154 is similarly rotated in the reverse direction, the planet gears 166 of the second planetary gear set 144 is rotated by the sun gear 164 in the direction similar to that of rotation of the input shaft 50. The one-way clutch 138 acts as a reaction brake which prevents the rear planet carrier 168 from being rotated by the sun gear 164 in the reverse direction. Accordingly, the ring gear 162 is rotated by the planet gears 166 in the direction similar thereto. Therefore, the output shaft 146 rotated integral with the ring gear 162 is also rotated in the direction similar thereto. The forward drive first speed gear is thus provided. At this condition, when the vehicle speed increases the second brake 134 is tightened. The power of the engine from the input shaft 50 is transmitted to the ring gear 152 by way of the rear clutch 132 similarly to in the case of the first speed. The second brake 134 acts as a reaction brake which locks the brake drum 172 to prevent the rotation of the sun gear 154. As a result, the planet pinions 158 revolves around the sun gear 154 in rest with the planet pinions 158 while rotates around its axis. Accordingly, the front planet carrier 160 and the output shaft 146 integral therewith are rotated at a speed higher than that in the case of the first speed but lower than that of the input shaft 50 in the direction similar thereto. The forward drive second speed gear is thus provided. When the vehicle speed further increases, the second brake 134 is loosened and the front clutch 130 is engaged. The engine power from the input shaft 50 is transmitted to the ring gear 152 by way of the rear clutch 132 on the one hand and to the sun gear 154 by way of the front clutch 130 on the other hand. The ring gear 152 and the sun gear 154 are locked to each other and are integrally rotated together with the front planet carrier 160 and the output shaft 146 at the same speed as that of the input shaft 50 in the direction similar thereto. Thus, the forward drive third speed gear is provided. In this instance, the front and rear clutches 130 and 132 act as input clutches and since the engine torque is not increased by the planetary gear set, there is no reaction brake.

When the manual selector lever is set to a rearward driving range position "R", the front clutch 130 and the low and reverse brake 136 are tightened. The engine power from the input shaft 50 is transmitted to the sun gears 154 and 164 by way of the front clutch 130 and the brake drum 172. Since the rear planet carrier 168 is locked by the low and reverse brake 136, when the sun gear 164 is rotated in the direction similar to the input shaft 50, the ring gear 162 and the output shaft 146 are integrally rotated at a speed lower than that of the input shaft 50 in the direction reverse thereto. Thus, the rearward drive gear is obtained.

Figure 3A:
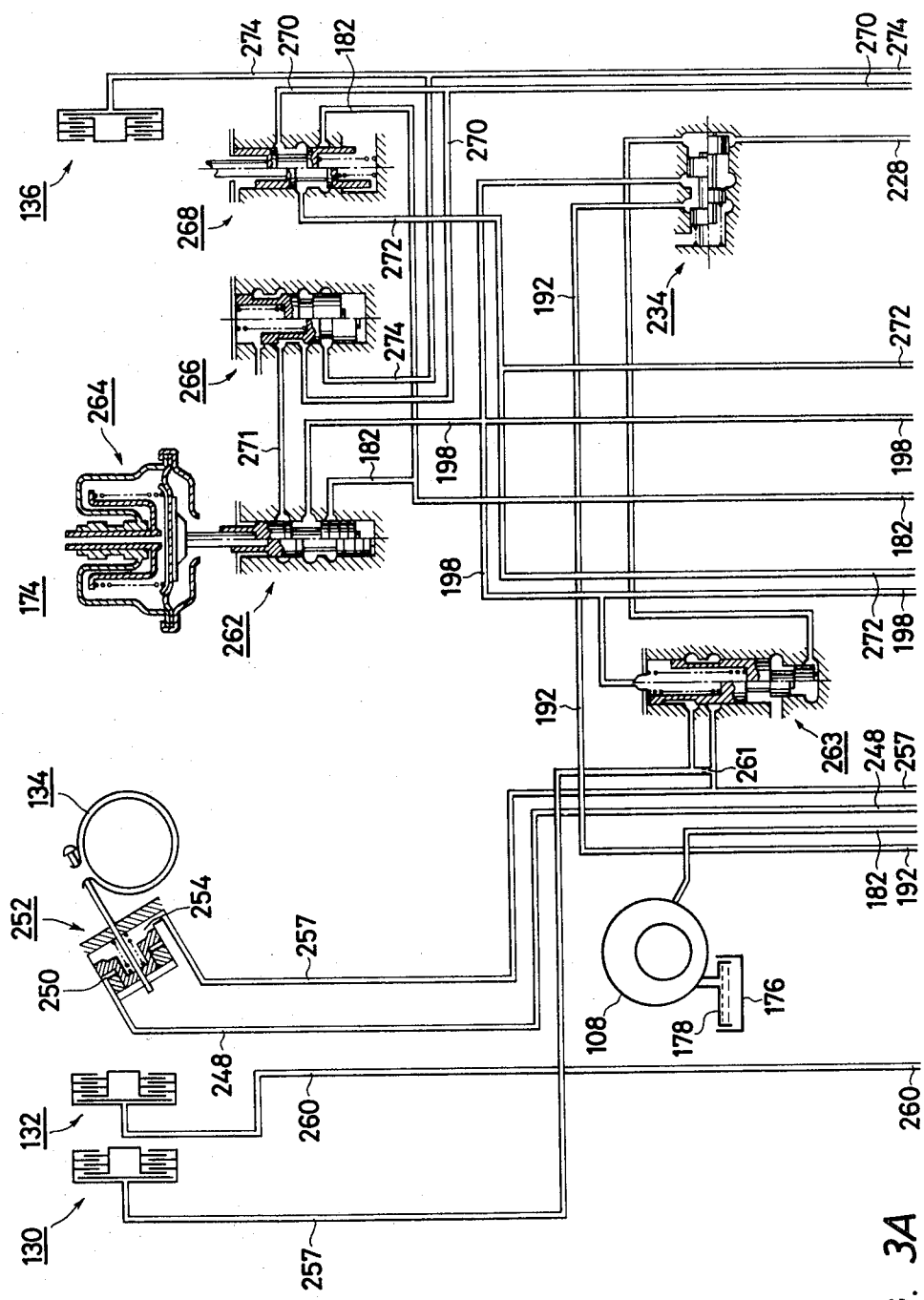
FIGS. 3A and 3B are schematic views of an embodiment of a hydraulic control system according to the invention for the automatic transmission shown in FIG. 2.
Figure 3B:
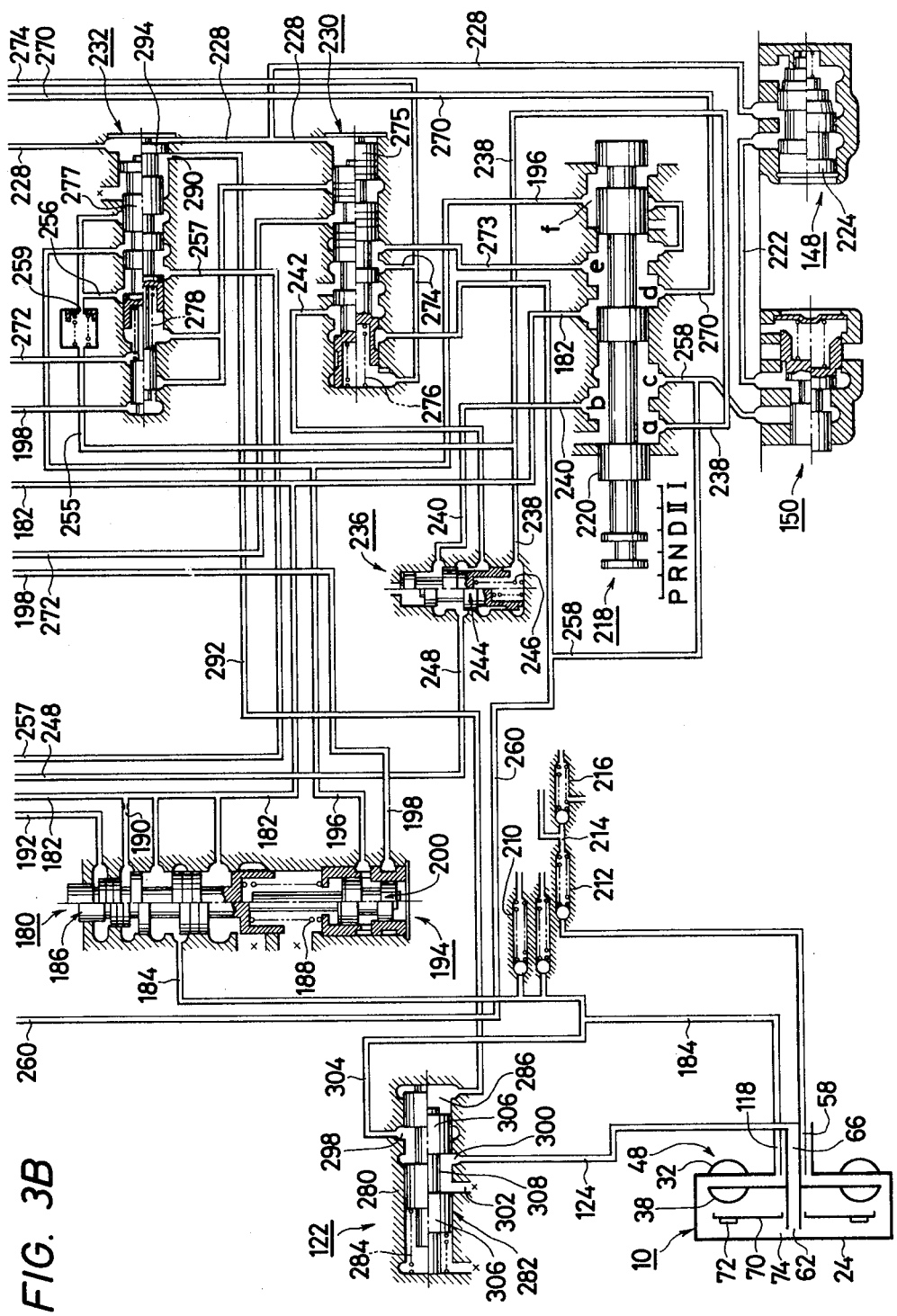

Referring to FIG. 3 of the drawings, there is shown an embodiment of a hydraulic control system according to the invention which is applied to the automatic transmission 129. The hydraulic control system, generally designated by the reference numeral 174, comprises the oil pump 108 which is driven by the engine through the pump impeller 32 and the pump drive shaft 114 at all times during operations of the engine. The oil pump 108 draws hydraulic fluid from a hydraulic fluid reservoir 176 by way of a strainer 178 eliminating foreign matters from the hydraulic fluid and delivers pressurized hydraulic fluid into a passage 182. The oil pump 108 communicates with a pressure regulator valve 180 by way of the passage 182. The pressure regulator valve 180 regulates the hydraulic fluid pressure in the passage 182 to a working pressure or a line pressure having a predetermined value. The passage 182 communicates with the annular passage 118 by way of the pressure regulator valve 180 and a passage 184 to feed the working pressure to the torque converter 48. The pressure regulator valve 180 has a spool 186 and a spring 188 urging the spool 186 upward in the drawing. The line pressure in the passage 182 acts on the spool 186 by way of an orifice 190 to urge the spool 186 downward in the drawing. The pressure regulator valve 180 communicates with a passage 192 to receive a hydraulic pressure therefrom which acts on the spool 186 to urge the same downward to reduce the line pressure in the passage 182. A pressure booster valve 194 communicates with a passage 196 to receive the line pressure therefrom and with a passage 198 to receive a throttle pressure therefrom and has a spool 200 which is urged by the line pressure in the passage 196 and by the throttle pressure in the passage 198 upward in the drawing. The spool 200 urges the spool 186 upward to increase the line pressure in the passage 182 when is urged upward. The passage 184 communicates with a front lubricated portion of a power transmitting mechanism by way of a valve 210 which is opened to supply lubricating hydraulic fluid thereto. The first annular space 58 communicates with a pressure retaining valve 212 which maintains the pressure in the space 58 below a predetermined value. When the pressure in the first annular space 58 is above the predetermined value, the pressure retaining valve 212 is opened to permit communication between the space 58 and a passage 214 to feed lubricating hydraulic fluid to a rear lubricated portion of the power transmitting mechanism. The passage 214 communicates with a relief valve 216 which is opened to reduce the pressure of the lubricating hydraulic fluid when the lubricating hydraulic fluid is excessively high.

A manual selector valve 218 has a port communicating with the passage 182, and a spool 220 connected to the manual selector lever through a linkage (not shown). The manual selector valve 218 has P,R,N,D,II and I range positions and ports a,b,c,d,e and f and is moved into the P,R,N,D,II and I range positions to control communication between the passage 182 and the ports a,b,c,d,e and f when the manual selector lever is manipulated. The port c communicates with the second governor valve 150 which modulates the line pressure into the governor pressure which is fed to the first governor valve 148 by way of a passage 222 when the vehicle travels. The first governor valve 148 serves as an on-off valve in which a spool 224 is moved to normally obstruct communication between the passage 22 and a passage 228 and to provide communication therebetween when the vehicle speed reaches a predetermined value. The passage 228 communicates with a 1-2 shift valve 230, a 2-3 shift valve 232 and a pressure modifier valve 234. The governor pressure in the passage 228 acts on an end of a spool of each of the valves 230, 232 and 234 to urge leftward in the drawing the spool which is urged by a spring rightward in the drawing. The ports a and b communicate with a second lock valve 236 by way of passages 238 and 240 respectively. The line pressure from the port a acts on a spool 244 of the second lock valve 236 to urge the spool 244 upward in the drawing. A spring 246 urges the spool 244 upward. The line pressure from the port b acts on the spool 244 to urge the same downward in the drawing. A passage 248 communicates with an applying chamber 250 of a servo 252 which controls the second brake 134. The passage 248 is communicable alternatively with the passage 240 and a passage 242 by way of the second lock valve 236. The passage 238 is communicable with a passage 257 by way of a passage 255, an orifice check valve 259, a passage 256 and the 2-3 shift valve 232. The passage 257 communicates with a release chamber 254 of the servo 252 and with the front clutch 130 by way of an orifice 261 and a 2-3 timing valve 263 which are arranged parallel with each other. The port c is communicable with the passage 242 by way of a passage 258 and the 1-2 shift valve 230 and communicates with the rear clutch 132 by way of the passage 258 and a passage 260. A throttle valve 262 communicates with the passages 182 and 198 and is operated by a diaphragm unit 264 responsive to a suction vacuum of the engine. The throttle valve 262 modulates the line pressure from the passage 182 is accordance with the engine suction vacuum and delivers in the passage 198 a throttle pressure which varies in accordance with the load of the engine. The port d communicates with a throttle backup valve 266 and with a forced downshift valve 268 by way of a passage 270. A passage 271 provides communication between the throttle valve 262 and the throttle backup valve 266. The passage 271 communicates with the passage 198 by way of the throttle valve 262 and is communicable with the passage 270 by way of the throttle backup valve 266. The passage 182 communicates with the downshift valve 268. A passage 272 communicates with the 1-2 shift valve 230 and the 2-3 shift valve 232 and is alternatively communicable with the passages 182 and 270 by way of the downshift valve 268. The port e is communicable with the low and reverse brake 136 and the throttle backup valve 266 by way of a passage 273, the 1-2 shift valve 230 and a passage 274. The port f communicates with the pressure regulator valve 180 by way of the passage 196 and is communicable with the passage 257 by way of the passage 196 and the 2-3 shift valve 232.

The manual selector valve 218 provides communication between the passage 182 and the ports a, b and c when the manual selector lever is set to the D range position. At this condition, the line pressure from the port c is fed to the rear clutch 132 to engage the same, and the spool 244 of the second lock valve 236 is pushed up to an upward position as shown in the right half of the illustration of the valve 236 and provides communication between the passages 242 and 248. Thus, the transmission 129 provides the forward drive first speed gear when the 1-2 shift valve 230 is in a right-hand position in the drawing to obstruct communication between the passages 242 and 258 and the 2-3 shift valve 232 is in a righthand position in the drawing to obstruct communication between the passages 256 and 257. At this state, when the vehicle speed increases to a predetermined or desired value, the spool 275 of the 1-2 shift valve 230 is moved by the governor pressure in the passage 228 in opposition to the action of the spring 276 from the right-hand position into a left-hand position in the drawing to provide communication between the passages 242 and 258. The line pressure in the passage 258 is fed into the applying chamber 250 of the servo 252 by way of the passage 242, the second lock valve 236 and the passage 248 to apply the second brake 134. The transmission 129 is thus automatically shifted from the forward drive first speed gear to the forward drive second speed gear. When the vehicle speed further increases to a predetermined higher value, the spool 277 of the 2-3 shift valve 232 is moved by the governor pressure in the passage 228 in opposition to the action of the spring 278 from the right-hand position to a left-hand position in the drawing to provide communication between the passages 256 and 257. The line pressure from the passage 257 is fed on the one hand to the release chamber 254 of the servo 252 to release the second brake 134 and on the other hand to the front clutch 130 to engage the same. The transmission 129 is automatically shifted from the forward drive second speed gear to the forward drive third speed gear. When a downshift effort is performed, the downshift valve 268 is moved by, for example, a solenoid (not shown) to provide communication between the passages 182 and 272 to shift the 1-2 shift valve 230 and the 2-3 shift valve 232 to the right-hand positions.

The manual selector valve 218 provides communication between the passage 182 and the ports b, c and d when the manual selector leve is set to the II (forward drive second speed lock) range position. In this instance, since the port a is separated from the passage 182 so that the line pressure is not fed from the passage 238 to the second lock valve 236, the spool 244 of the second lock valve 236 is pushed down by the line pressure in the passage 240 in opposition to the action of the spring 246 to a downward position as shown in the left half of the illustration of the valve 236 and provides communication between the passages 240 and 248. The line pressure is fed from the passage 248 to the apply chamber 250 of the servo 252 to apply the second brake 134 and is also fed from the port c to the rear clutch 132 to engage the same. Since the line pressure is not fed from the port a to the passage 255 so that the release of the second brake 134 and the engagement of the front clutch 130 do not occur, the transmission 129 is not shifted to the forward drive third speed gear. Thus, the transmission 129 is locked in the forward drive second speed gear. The throttle backup valve 266 delivers a hydraulic pressure into the passage 271 in response to the line pressure from the passage 270. The throttle valve 262 delivers into the passage 198 a hydraulic pressure higher than the throttle pressure which is independent of the engine load in response to the hydraulic pressure from the passage 271. The pressure regulator valve 180 increases the line pressure in response to the hydraulic pressure from the passage 198 so that the engine brake effect is promoted.

The manual selector valve 218 is moved to provide communication between the passage 182 and the ports c, d and e when the manual selector lever is set to the I (forward drive first speed gear lock) range position. The rear clutch 132 is engaged by the line pressure fed from the port c by way of the passage 258. The 1-2 shift valve 230 is moved into the right-hand position by the line pressure fed from the port d by way of the downshift valve 268 and the passage 272. The low and reverse brake 136 is applied by the line pressure fed from the port e by way of the 1-2 shift valve 230 and the passage 274. Thus, the transmission 129 provides the forward drive first speed gear. The line pressure from the passage 274 also acts on the 1-2 shift valve 230 to lock the same in the right-hand position. Thus, the forward drive first speed gear is locked. The throttle backup valve 266 stops to deliver the hydraulic pressure into the passage 271 so that the throttle valve 262 delivers the throttle pressure into the passage 198.

The manual selector valve 218 provides communication between the passage 182 and the ports d, e and f when the selector lever is set to the R(reverse drive gear) range position. The low and reverse brake 136 is applied by the line pressure from the port e, while the line pressure is fed from the port f to the release chamber 254 of the servo 252 and to the front clutch 130 by way of the 2-3 shift valve 232 and the passage 257 to release the second brake 134 and to engage the front clutch 130. Thus, the transmission 129 provides the reverse drive gear.

The lockup control valve 122 is incorporated into the hydraulic control system 174 to constitute a hydraulic control system for controlling the torque converter 48 and the lockup clutch 73. The lockup control valve 122 is so constructed and arranged that the lockup clutch 73 is engaged to effect a lockup condition of the torque converter 48 when the transmission 129 provides the forward drive top speed gear and the vehicle speed is above a predetermined value. The lockup control valve 122 comprises a valve body 280, a spool 282 slidably fitted in the valve body 280, and a spring 284 urging the spool 282 rightward in the drawing. A space 286 is provided between an end surface of the spool 282 and an internal wall surface of the valve body 280 to receive the governor pressure. A port 290 is formed in a valve body of the 2-3 shift valve 232 and is communicable with the passage 228 to take out the governor pressure therefrom. A passage 292 provides communication between the space 286 and the port 290. The spool 277 of the 2-3 shift valve 232 has a land 294 which obstructs communication between the port 290 and the passage 228 when the spool 277 is in the right-hand position shown in the lower half of the illustration of the 2-3 shift valve 232 and which permits communication between the port 290 and the passage 228 when the spool 277 is in the left-hand position shown in the upper half of the illustration of the valve 232. The governor pressure in the space 286 urges the spool 282 leftward in the drawing.

The valve body 280 of the lockup control valve 122 is formed with inlet and outlet ports 298 and 300, and a drain port 302 which communicates with a drain line (not shown). The inlet port 298 communicates with the passage 184 by way of a passage 304, while the outlet port 300 communicates with the passage 124 and is alternatively communicable with the inlet and drain ports 298 and 302. The spool 282 has a land portion 306 and a groove 308. The land portion 306 obstructs communication between the outlet and drain ports 300 and 302 and the groove 308 provides communication between the inlet and outlet ports 298 and 300 when the spool 282 is in a position as shown in the upper half of the illustration of the valve 122. The land portion 306 obstructs communication between the inlet and outlet ports 298 and 300 and the groove 308 provides communication between the outlet and drain ports 300 and 302 when the spool 282 is in a position as shown in the lower half of the illustration of the valve 122.

Figure 4:
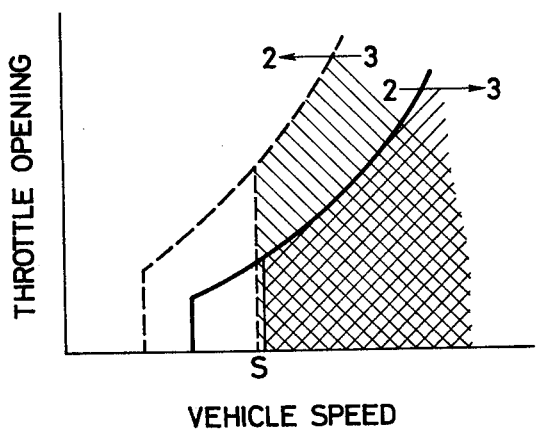
FIG. 4 is a graphic representation of a relationship between the speed of a vehicle equipped with the transmission and the degree of opening of a throttle valve for an engine of the vehicle at speed changes and a range within which a lock-up condition of the torque converter is effected.

The hydraulic control system 174 for the torque converter 48 thus described is operated as follows:

When the vehicle travels with the transmission 129 in a speed gear other than the maximum speed gear, the 2-3 shift valve 232 obstructs communication between the passages 228 and 292 so that the governor pressure is not fed to the space 286 of the lockup clutch control valve 122. Also, when the vehicle travels with the transmission 129 in the maximum speed gear and at a speed lower than a predetermined value S as shown in FIG. 4 of the drawings, the force of the governor pressure in the space 286 acting on the spool 282 is smaller than the force of the spring 284. In these two cases, since the spool 282 of the lockup clutch control valve 122 is moved by the action of the spring 284 into the right-hand position shown in the upper half of the illustration of the valve 122, the port 300 communicates with the port 298 so that the working pressure is fed to the torque converter 48 by way of the passage 304, the ports 298 and 300 and the passages 124, 60, 68 and 62. Accordingly, the working pressures acting on both side surfaces of the lock-up clutch piston 70 are balanced with each other so that the face plate 72 of the piston 70 is not pressed against the converter cover 24. Thus, the lock-up condition of the torque converter 48 is released.

At this state, the hydraulic working fluid flowing within the torque converter 48 transmits the rotational torque of the pump impeller 32 to the turbine runner 38 under reaction created by the stator 42, performing torque conversion so that the torque converter 48 usually produces the torque multiplying effect. The power of the engine is transmitted from the turbine runner 38 to the input shaft 50 by way of the hub 40 and then to the gear train of the transmission 129.

When the transmission 129 provides the third speed gear or the maximum speed gear of the D range, the spool 277 of the 2-3 shift valve 232 is in the left-hand position shown in the upper half of the illustration of the valve 232. Accordingly, the port 290 communicates with the passage 228 so that the governor pressure is admitted into the space 286 of the lock-up clutch control valve 122 by way of the passage 292. At this state, when the vehicle speed is increased to a value above the predetermined value S in 2nd-3rd and 3rd-2nd speed shift patterns shown in FIG. 4, the governor pressure in the space 286 of the lock-up clutch control valve 122 is increased in response to the increase in the vehicle speed to move the spool 282 into the left-hand position shown in the lower half of the illustration of the valve 122 in opposition to the force of the spring 284. As a result, the port 300 is separated from the port 298 and communicates with the drain port 302 to cause hydraulic working fluid in the lockup control chamber 74 to escape into the drain line by way of the passages 64, 62, 66, 68, 60 and 124 and the ports 300 and 302. Accordingly, the lockup clutch piston 70 is moved toward the converter cover 24 by the pressure differential produced between the lock-up control chamber 74 and the torque converter chamber 77 to press the face plate 72 of the lock-up clutch piston 70 against an internal end wall surface of the converter cover 24. By engagement of the lock-up clutch 73, the drive shaft 16 and the pump impeller 32 are directly drivingly connected to the turbine runner 38 by way of the converter cover 24, the lock-up clutch piston 70 and the torsional damper 80 to effect the lock-up condition of the torque converter 48 in which condition the turbine runner 38 is driven not by the hydraulic working fluid therein. At this state, the lock-up clutch piston 70 is rotated integrally with the drive shaft 16 and therefore the pump impeller 32. The rotation of the lock-up clutch piston 70 is transmitted to the turbine runner 38 by way of the torsional damper 80, that is, particularly, the connection member 78, the projections 98, the drive plate 82, the torsion spring 88 and the driven plates 84 and 86 in order. An impact at the initial stage of transmission of the engine torque of the turbine runner 38 is absorbed by the torsion spring 88. Accordingly, the torsional damper 80 serves to absorb the impact and at the same time to transmit the engine torque.

The range in which the lock-up condition of the torque converter 48 is attained is a range shown by diagonal lines in FIG. 4 which is below each of the 2nd-3rd and 3rd-2nd speed shift lines and is higher than the predetermined value S. In this range, the vehicle is smoothly travelling without producing vibration due to alternation of the engine torque and the fuel consumption of the vehicle is reduced since the torque converter 48 produces no slippage between the pump impeller 32 and the turbine runner 38.

A hydraulic control system according to the invention can be applied to torque converter assemblies other than the torque converter assembly shown in FIG. 1 and described hereinbefore, for example, to a torque converter assembly in which the lock-up condition of a torque converter is effected and released by supply of hydraulic working fluid to a lock-up control chamber and exhaust of hydraulic working fluid from the lock-up control chamber, respectively.

What is claimed is:

1. A hydraulic control system for a vehicular automatic transmission including fluid operable units and a torque converter with a lock-up clutch, comprising:
    a source of first pressurized fluid adapted to be used for operating the fluid operable units;
    a source of second pressurized fluid that is indicative of the vehicle speed;
    a lock-up control valve communicating with the torque converter and including a single control chamber and a valve member exclusively movable in response to pressure within said control chamber, said valve member being movable between a lock-up position in which the lock-up clutch is engaged and a release position in which the lock-up clutch is disengaged;
    and
    a shift valve communicating with said source of first pressurized fluid and with at least one of the fluid operable units, said shift valve including a chamber having a first port communicating with said source of second pressurized fluid, a second port communicating with said control chamber of said lock-up control valve and a port for drainage, said shift valve including a valve member movable between a low speed position in which said second port communicates only with said port for drainage and a high speed position in which said second port communicates only with said first port.

2. A hydraulic control system for a transmission including a torque converter assembly having a torque converter chamber, a lock-up control chamber and a clutch piston urged toward a lock-up position in response to a difference in pressure between a pressure within the torque converter chamber and within the lock-up control chamber, comprising:
    a source of first pressure;
    a source of second pressure indicative of the vehicle speed;
    a passageway leading to the lock-up chamber;
    a lock-up control valve including a single control chamber, said lock-up control valve being operable to communicate said passageway with said source of first pressure to pressurize said lock-up control chamber to urge the piston toward a released position thereof against the pressure within the torque converter chamber when the pressure within said single control chamber of said lock-up control valve is lower than a predetermined level and operable to drain said third passageway to depressurize said lock-up control chamber so as to establish a pressure differential across the piston to urge same to an engaged position thereof when the pressure in said single control chamber of said lock-up control valve is higher than said predetermined level;
    a shift valve including a valve member movable between a high speed position and a low speed position, said shift valve being operable to communicate said single control chamber of said lock-up control valve with said source of second pressure when said valve member takes the high speed position thereof.

3. A hydraulic control system as claimed in claim 2, wherein said shift valve includes:
    a first port communicating with said source of second pressure;
    a second port communicating with said chamber of said lock-up control valve; and
    a drain port;
    said valve member of said shift valve permitting connection of said second port with only said first port when said valve member takes the high speed position said valve member of said shift valve permitting connection of said record port with only said drain port when said valve member takes the low speed position.

4. In a hydraulic control system for a vehicular automatic transmission including a torque converter equipped with a lock-up clutch which includes a piston movable from a disengaged position to an engaged position in response to the establishment of a given pressure differential thereacross, the combination comprising:
a first source of pressurized fluid;
a second source of pressurized fluid indicative of vehicle speed;
a clutch control valve having a control chamber communicated with said second source, said clutch control valve having a member movable from a first position to a second position in response to the pressure in said control chamber exceeding a predetermined limit,
said clutch control valve being adapted to communicate a portion of said torque converter with said first source of pressurized fluid when said movable member assumes said first position so as to eliminate said pressure differential across said piston and to communicate said portion of said torque conconverter with a drain passage to establish said pressure differential across said piston when said movable member assumes said second position thereof; and
a shift valve for controlling the selection of the gears of said transmission and which has a member movable between a high speed gear position and a low speed position, said shift valve being interposed between said second source and said control chamber and adapted to block communication between said second source and said control chamber when the movable member of said shift valve assumes said low speed position and permit the communication between said second source and said control chamber when the movable member of said shift valve assumes said high speed gear position thereof.

* * * * *